(12) United States Patent
Okamura

(10) Patent No.: US 11,146,696 B2
(45) Date of Patent: Oct. 12, 2021

(54) IMAGE PROCESSING SYSTEM, IMAGE PROCESSING APPARATUS, AND IMAGE PROCESSING METHOD USING A PLURALITY OF BOXES FOR A BOX FUNCTION CORRESPONDING TO USER IDENTIFIED VOICE ID

(71) Applicant: CANON KABUSHIKI KAISHA, Tokyo (JP)

(72) Inventor: Shintaro Okamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/580,091

(22) Filed: Sep. 24, 2019

(65) Prior Publication Data

US 2020/0106895 A1  Apr. 2, 2020

(30) Foreign Application Priority Data

Sep. 28, 2018 (JP) .............................. JP2018-184982

(51) Int. Cl.
| | | |
|---|---|---|
| H04N 1/00 | (2006.01) | |
| G06F 3/16 | (2006.01) | |
| G10L 17/04 | (2013.01) | |
| H04R 1/02 | (2006.01) | |
| G06F 3/12 | (2006.01) | |
| H04R 1/08 | (2006.01) | |
| G10L 17/00 | (2013.01) | |

(52) U.S. Cl.
CPC ........... *H04N 1/00403* (2013.01); *G06F 3/12* (2013.01); *G06F 3/167* (2013.01); *G10L 17/00* (2013.01); *G10L 17/04* (2013.01); *H04N 1/0044* (2013.01); *H04N 1/00244* (2013.01); *H04N 1/00488* (2013.01); *H04R 1/028* (2013.01); *H04R 1/08* (2013.01)

(58) Field of Classification Search
USPC .............. 358/1.1–3.29, 1.11–1.18, 462–468; 367/1–25, 93–116, 198, 118–138; 380/243–255; 381/309, 26, 58–61, 75, 381/89–93; 382/115–119, 124–133, 382/155–231, 305, 317; 704/1–277; 715/727–743, 865

See application file for complete search history.

(56) References Cited

U.S. PATENT DOCUMENTS

| | | | | |
|---|---|---|---|---|
| 2006/0221390 | A1* | 10/2006 | Tomita ................... | G06F 3/126 358/1.15 |
| 2008/0074689 | A1* | 3/2008 | Yamada ............. | H04N 1/32368 358/1.13 |
| 2009/0204411 | A1* | 8/2009 | Morikawa ............... | G10L 17/26 704/275 |

(Continued)

FOREIGN PATENT DOCUMENTS

JP  2014222513 A  11/2014

*Primary Examiner* — Marcellus J Augustin
(74) *Attorney, Agent, or Firm* — Venable LLP

(57) ABSTRACT

An image processing system capable of managing image data using a plurality of boxes, comprises a microphone that obtains a sound, an obtaining unit that obtains a user identifier based on voice information of a user obtained via the microphone, a specifying unit that specifies one box among the plurality of boxes based on specification information including at least the user identifier, and an informing unit that informs the user of information related to the specified one box.

15 Claims, 11 Drawing Sheets

(56) References Cited

U.S. PATENT DOCUMENTS

| | | | |
|---|---|---|---|
| 2010/0284035 A1* | 11/2010 | Kil | G06F 3/1238 |
| | | | 358/1.15 |
| 2012/0016678 A1 | 1/2012 | Gruber et al. | |
| 2012/0232886 A1* | 9/2012 | Capuozzo | G10L 15/22 |
| | | | 704/9 |
| 2015/0382047 A1* | 12/2015 | Van Os | G09C 1/00 |
| | | | 725/38 |
| 2018/0061404 A1* | 3/2018 | Devaraj | G10L 15/22 |
| 2019/0266286 A1* | 8/2019 | Torras | G06F 16/9535 |

\* cited by examiner

FIG. 7

FILE MANAGEMENT INFORMATION

| | | |
|---|---|---|
| FILE NAME: | 20171201-0001.pdf | 701 |
| SAVING DATE AND TIME: | 2017/12/01 | 702 |
| PAPER SIZE: | A4 | 703 |
| PAGE COUNT: | 3 | 704 |
| BOX NUMBER: | 5 | 705 |
| USER ID: | Suzuki | 706 |
| VOICE ID: | 0001 | 707 |

FIG. 8

INFORMATION FOR EXECUTING ACTION

| | | |
|---|---|---|
| 801 | CALL NAME: | BOX |
| 802 | ACTION: | SAVE, PRINT, TRANSMIT |
| 803 | ADDITIONAL INFORMATION (TIME) | ○ MONTH, ○ DAY, ○ HOUR, ○ MINUTE, TODAY, YESTERDAY, ○ DAYS AGO |
| 804 | ADDITIONAL INFORMATION (BOX NUMBER) | No. ○ |

※ ○ REPRESENTS A NUMBER

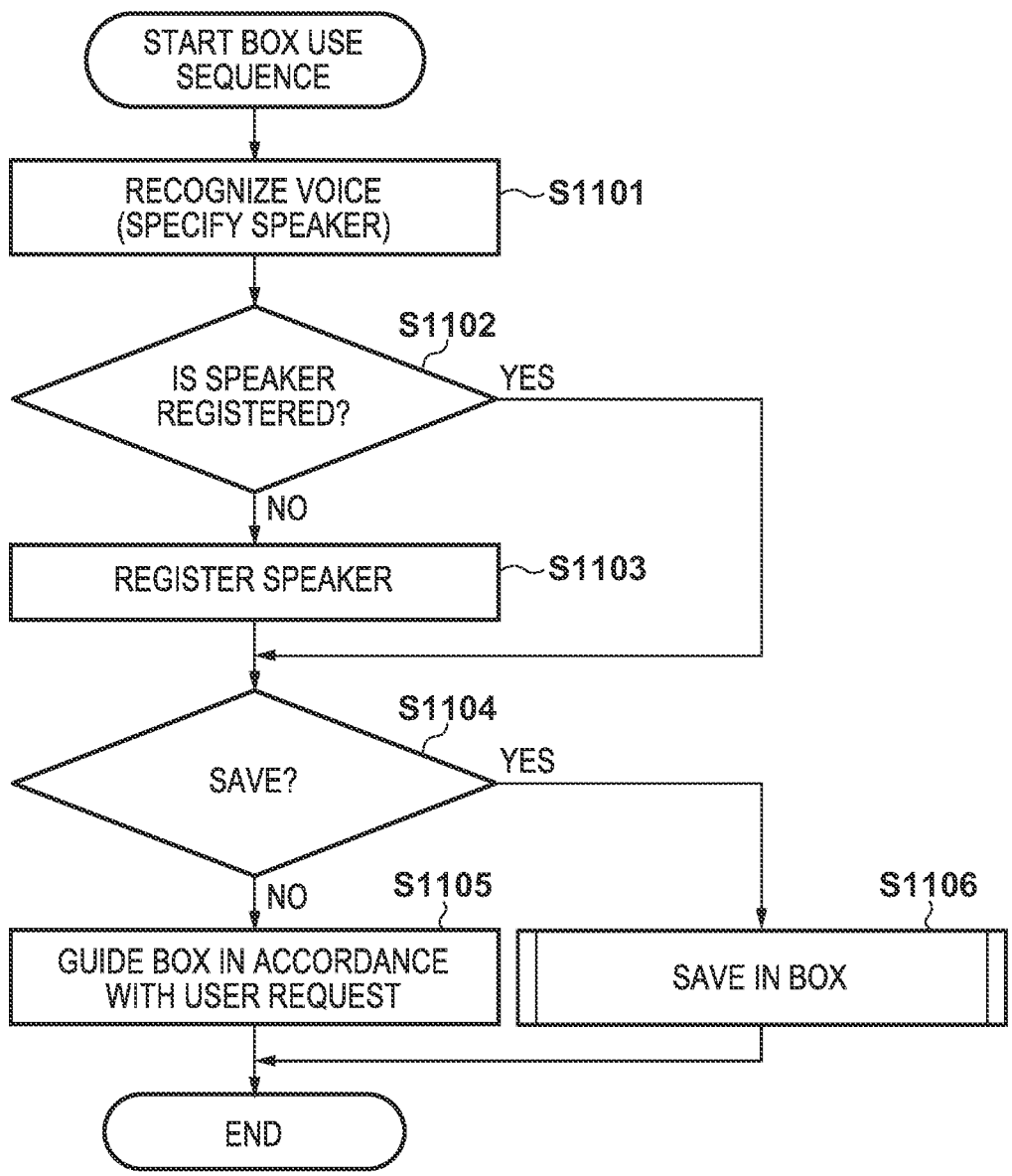

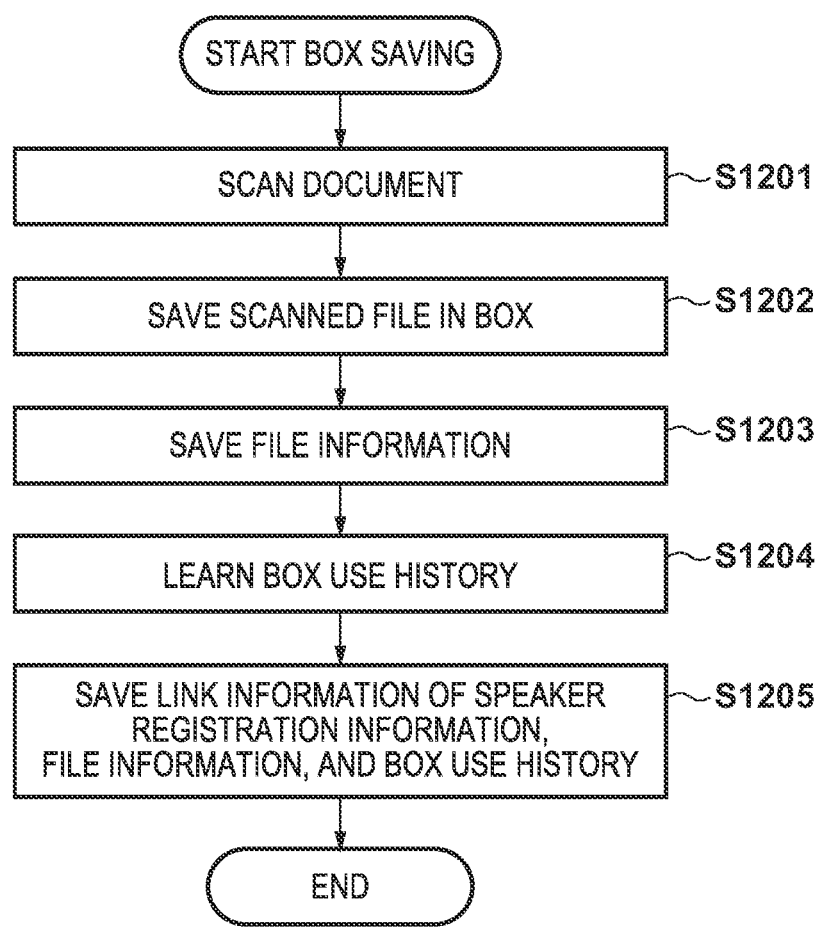

IMAGE PROCESSING SYSTEM, IMAGE PROCESSING APPARATUS, AND IMAGE PROCESSING METHOD USING A PLURALITY OF BOXES FOR A BOX FUNCTION CORRESPONDING TO USER IDENTIFIED VOICE ID

BACKGROUND OF THE INVENTION

Field of the Invention

The present invention relates to an image processing system, an image processing apparatus, and an image processing method.

Description of the Related Art

In addition to a copy function, a multi-function peripheral has a function (box function) of storing a document image read by a scanner in a storage device such as an HDD (Hard Disk Drive) in a copying machine so as to be able to reuse the image. Image data stored in a box can be called via a UI (User Interface) to be printed or transmitted to the outside via a network. In this manner, image data in the box is used for multi-purpose applications.

However, along with the advanced functions of electronic devices such as a multi-function peripheral described above, operations are becoming complicated for a user. Japanese Patent Laid-Open No. 2014-222513 proposes an interaction agent that enables instructions and operations in a natural language.

However, the above-described related art has a problem as follows. For example, in the box function, an area in which image data is to be stored is divided into a plurality of areas (boxes) each assigned with a box number. Accordingly, a user can use the plurality of areas having different box numbers, for example, in accordance with the applications of the image data. However, in the above-described related art, in a box operation using the interaction agent, the user may not remember a document which was saved in one of the plurality of boxes and the document saving time. Therefore, the user eventually needs to select the desired image file while checking the contents of the boxes on the UI, which requires complicated operations. This leads to degradation in usability owing to the interaction agent.

SUMMARY OF THE INVENTION

The present invention enables realization of a mechanism for, when accessing information saved in an apparatus by an operation via an interaction agent, appropriately specifying information that a user wants to access, thereby improving the user convenience.

One aspect of the present invention provides an image processing system capable of managing image data using a plurality of boxes, comprising: a microphone that obtains a sound; an obtaining unit that obtains a user identifier based on voice information of a user obtained via the microphone; a specifying unit that specifies one box among the plurality of boxes based on specification information including at least the user identifier; and an informing unit that informs the user of information related to the specified one box.

Another aspect of the present invention provides an image processing apparatus capable of managing image data using a plurality of boxes, comprising: a microphone that obtains a sound; an obtaining unit that obtains a user identifier based on utterance information of a user obtained via the microphone; a specifying unit that specifies one box among the plurality of boxes based on information including at least the user identifier; and an informing unit that informs the user of information related to the specified one box.

Still another aspect of the present invention provides an image processing method capable of managing image data using a plurality of boxes, comprising: obtaining a user identifier based on voice information of a user obtained via a microphone; specifying one box among the plurality of boxes based on specification information including at least the user identifier; and informing the user of information related to the specified one box.

Yet still another aspect of the present invention provides an image processing system capable of managing image data using a plurality of boxes, comprising: a microphone that obtains a sound; an obtaining unit that obtains a user identifier based on utterance information of a user obtained via the microphone; a specifying unit that specifies, based on specification information including at least the user identifier, one image data stored in one of the plurality of boxes; and an output unit that executes output based on the specified one image data.

Still yet another aspect of the present invention provides an image processing method capable of managing image data using a plurality of boxes, comprising: obtaining a user identifier based on utterance information of a user obtained via a microphone; specifying, based on specification information including at least the user identifier, one image data stored in one of the plurality of boxed; and executing output based on the specified one image data.

Further features of the present invention will be apparent from the following description of exemplary embodiments with reference to the attached drawings.

BRIEF DESCRIPTION OF THE DRAWINGS

FIG. 7 is a view showing an example of file management information according to the first embodiment;

FIG. 8 is a view showing information for executing an action according to the first embodiment;

FIG. 11 is a flowchart illustrating an example of process procedure of the multi-function peripheral according to the first embodiment; and FIG. 12 is a flowchart illustrating a saving process of the multi-function peripheral according to the first embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A multi-function peripheral (digital multi-function peripheral/MFP) will be described as an example of an image processing apparatus according to an embodiment. However, the present invention can be applied to an electrophotographic image processing apparatus such as a laser printer or a FAX machine without departing from the spirit and scope of the present invention. Further, the present invention need not limit the application target to the image processing apparatus, and can also be applied to an information processing apparatus that does not have an image forming function or an image processing function.

First Embodiment

<Arrangement of Image Processing Apparatus>

Figure 1:
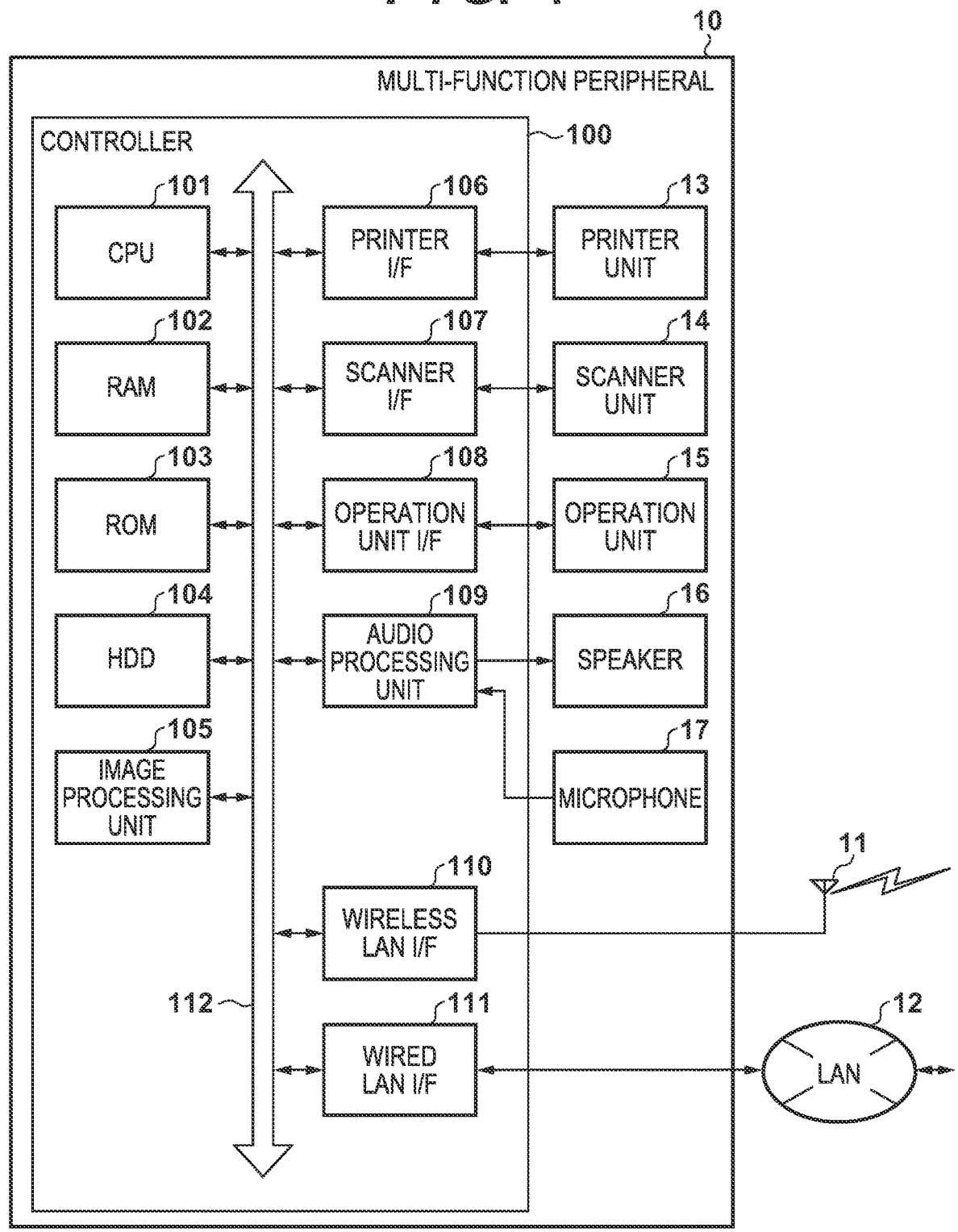
FIG. 1 is a block diagram showing the hardware arrangement of a multi-function peripheral according the first embodiment.

The first embodiment of the present invention will be described below with reference to the accompanying drawings. First, the hardware arrangement of a multi-function peripheral 10 according to this embodiment will be described with reference to FIG. 1. The multi-function peripheral 10 of this embodiment is assumed to have a scanner function, but it may not have a scanner function. Further, an example in which the present invention is applied to an image processing apparatus will be described, but it is optional how to assign a function or the like, which is implemented by apparatuses in an image processing system to be described later with reference to FIG. 2 in cooperation with each other, to the image processing apparatus and the other apparatuses. Therefore, the present invention is not intended to be limited to the configuration of this embodiment to be described below.

The multi-function peripheral 10 includes a printer unit 13, a scanner unit 14, an operation unit 15, a speaker 16, a microphone 17, and a controller 100. The controller 100 includes a CPU 101, a RAM 102, a ROM 103, an HDD 104, an image processing unit 105, a printer I/F 106, a scanner I/F 107, an operation unit I/F 108, an audio processing unit 109, a wireless LAN I/F 110, and a wired LAN I/F 111.

The CPU 101 reads out control programs stored in the ROM 103 to execute various processes for comprehensively controlling the operation of the multi-function peripheral 10. The ROM 103 stores control programs and the like. The RAM 102 is used as a temporary storage area such as a main memory and work area of the CPU 101, and is also used as an image memory for holding image data having undergone various image processing by the image processing unit 105 at the time of printing or the like. The HDD 104 stores various data such as print data or a scanned image. The HDD 104 includes a plurality of divided box areas (for example, 100 box areas) to be described below, thereby providing a box function. Note that in the case of the multi-function peripheral 10, it is assumed that one CPU 101 executes respective processes illustrated in the flowcharts to be described later, but another configuration may be used. For example, a plurality of CPUs may be configured to execute the respective processes illustrated in the flowcharts to be described later in cooperation with each other.

The printer unit 13 is controlled by the CPU 101 via the printer I/F 106, and executes a print process on a sheet based on print data received from an external apparatus, a scanned image generated by the scanner unit 14, or the like. The scanner unit 14 is controlled by the CPU 101 via the scanner I/F 107, and reads a document to generate a scanned image (read image data). The scanned image generated by the scanner unit 14 is printed on a sheet or the like by the printer unit 13 or stored in a box area in the HDD 104.

The operation unit 15 includes a liquid crystal display unit having a touch panel function or a keyboard, and displays various images. A user can input an instruction or information to the multi-function peripheral 10 via the operation unit 15. The operation unit 15 is connected to the controller 100 via the operation unit I/F 108.

The speaker 16 is an output interface for transmitting a sound wave signal processed by the audio processing unit 109. The microphone 17 is an input interface for receiving a sound wave signal from the outside. The wired LAN I/F 111 is connected to a LAN 12 via a LAN I/F connector, and performs network communication with a PC at communication destination. The wireless LAN I/F 110 performs wireless LAN communication with an external apparatus (not shown) such as an access point via a wireless LAN communication unit 11 which is an antenna. Respective blocks in the controller 100 are connected to each other so as to be able to transmit and receive data via a system bus 112. The microphone 17 is an input interface for receiving a sound wave signal from the outside. The speaker 16 is an output interface for transmitting a sound wave signal processed by the audio processing unit 109 in the controller 100 of the multi-function peripheral 10.

<System Configuration>

Figure 2:
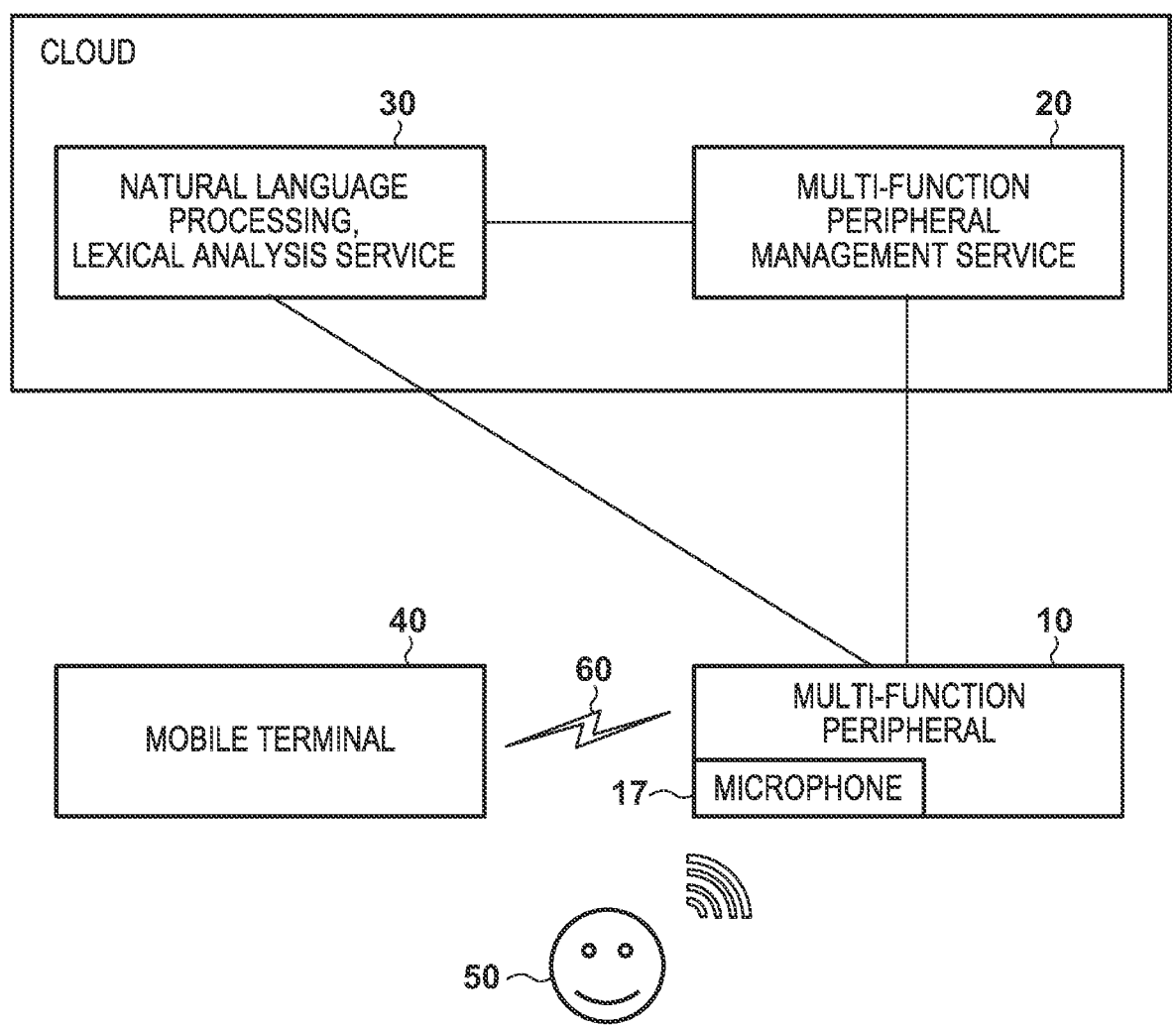
FIG. 2 is a view showing the system configuration according to the first embodiment.

Next, the system configuration of this embodiment will be described with reference to FIG. 2. The multi-function peripheral 10 according to this embodiment includes an interaction agent that interacts with a user by a voice input or the like. The interaction agent receives an operation input in a natural language from a user 50 via the microphone 17, and transmits it to a natural language processing/lexical analysis service (for example, server apparatus) 30 on a cloud. Here, the multi-function peripheral 10 is not limited to obtain the voice of a user using the microphone 17 connected to the multi-function peripheral 10, but a microphone (not shown) built in a mobile terminal 40 may be used. In this case, wireless or wired connection 60 between the multi-function peripheral 10 and the mobile terminal 40 using a wireless LAN or USB enables transmission of the voice of the user input to the mobile terminal 40 to the natural language processing/lexical analysis service 30 via the multi-function peripheral 10. Alternatively, the voice may be transmitted from the mobile terminal 40 directly to the natural language processing/lexical analysis service 30.

In this embodiment, the natural language processing/lexical analysis service 30 is described as a service on the cloud. However, the present invention is not intended to be limited to this, and the natural language processing/lexical analysis service 30 may be provided in the multi-function peripheral 10, the mobile terminal 40, or the like. When the natural language processing/lexical analysis service 30 receives an operation in the natural language from a user via the interaction agent on the multi-function peripheral 10 or the mobile terminal 40, it performs natural language processing and analyzes the extracted word and phrase. In accordance with the result, the natural language processing/lexical analysis service 30 communicates with a multi-function peripheral management service 20, which is a service on the cloud, and the multi-function peripheral management service 20 communicates with the multi-function peripheral 10 based on the communication from the natural language processing/lexical analysis service 30. The multi-function peripheral management service 20 is an example of a management server. The multi-function peripheral management service 20 is an intermediate function provided between the natural language processing/lexical analysis service 30 and a plurality of multi-function peripherals, and it transmits an instruction from the multi-function peripheral management service 20 to a predetermined multi-function peripheral and informs the natural language processing/lexical analysis service 30 of a response from the multi-function peripheral. Note that the multi-function peripheral management service 20 may be provided in the same apparatus as the natural language processing/lexical analysis service 30, or may be provided in another apparatus. In this embodiment, an operation in a case in which the microphone 17 connected to the multi-function peripheral 10 is used for obtaining the voice of a user will be described as an example.

<Interaction Agent>

Next, an operation example of the interaction agent of this embodiment will be described with reference to FIG. 3. First, the interaction agent is activated by the user 50 operating the operation unit 15 of the multi-function peripheral 10 or the user 50 uttering a predetermined word to the multi-function peripheral 10, and the multi-function peripheral 10 enters an interaction mode. Then, in a state in which the interaction agent on the multi-function peripheral 10 is activated, the user 50 instructs to activate a box function by the voice in the natural language in 301. As described above, the box function provides a function of saving files in a plurality of box areas provided in the HDD 104 and reading out a file from a predetermined box area. Reference numerals 301 and 303 denote pieces of information input by the voices of the user 50. Reference numerals 302, 304, and 305 denote natural language data played by voices via the speaker 16 or displayed on the operation unit 15 in accordance with transmission from the natural language processing/lexical analysis service 30. The contents shown in FIG. 3 may be displayed on the operation unit or the like of the multi-function peripheral 10 or the mobile terminal 40.

The multi-function peripheral 10 transmits the input natural language data 301 to the natural language processing/lexical analysis service 30. The natural language processing/lexical analysis service 30 analyzes the input natural language data and divides it into clauses and words. Then, nouns are taken out from the respective words, and those nouns are classified into proper nouns and other nouns. Based on the result, it is determined whether all pieces of pre-registered "information for executing an action" are obtained from the classified nouns.

FIG. 8 shows an example of information (specification information) 800 for executing an action in this embodiment. For example, a call name 801 "box" to use the box function in this embodiment, an action 802 "save, print, transmit" for the box function are registered in advance. In addition, additional information 803 "○ month, ○ day, ○ hour, ○ minute, today, yesterday, ○ days ago" representing time and additional information 804 "No. ○" representing a box number indicating a predetermined box area are registered in advance. As a result of determination of the natural language data 301 by the natural language processing/lexical analysis service 30, in the example shown FIG. 3, it is determined that additional information 2 "box number" (804) is not obtained among the pieces of "information for executing an action". Therefore, the natural language processing/lexical analysis service 30 transmits an inquiry for specifying "box number" to the multi-function peripheral 10.

The interaction agent of the multi-function peripheral 10 outputs the received inquiry 302 as at least one of a voice and display. In this embodiment, each of the additional information 803 and 804 is not necessarily required information but auxiliary information determined together with the action 802. As another example using these pieces of information, it is possible to operate the box function using multiple patterns of natural language data, such as "transmit the file saved ○ days ago" and "print the file saved in a box of No. ○".

In 303, the user 50 gives, in the natural language, the box number used for saving to the interaction agent on the multi-function peripheral 10. The multi-function peripheral 10 transmits the input natural language data to the natural language processing/lexical analysis service 30. The natural language processing/lexical analysis service 30 analyzes the received input. As a result, since all the pieces of pre-registered "information for executing an action" are obtained, the natural language processing/lexical analysis service 30 requests the multi-function peripheral management service 20 to start the box function. Then, the multi-function peripheral management service 20 responds in the natural language to the multi-function peripheral 10 that the process is started via the natural language processing/lexical analysis service 30 (304), and the box saving process is executed. The multi-function peripheral 10 informs the user by the voice that a document scan is being performed (305).

<Sequence of Saving Process>

Figure 4:
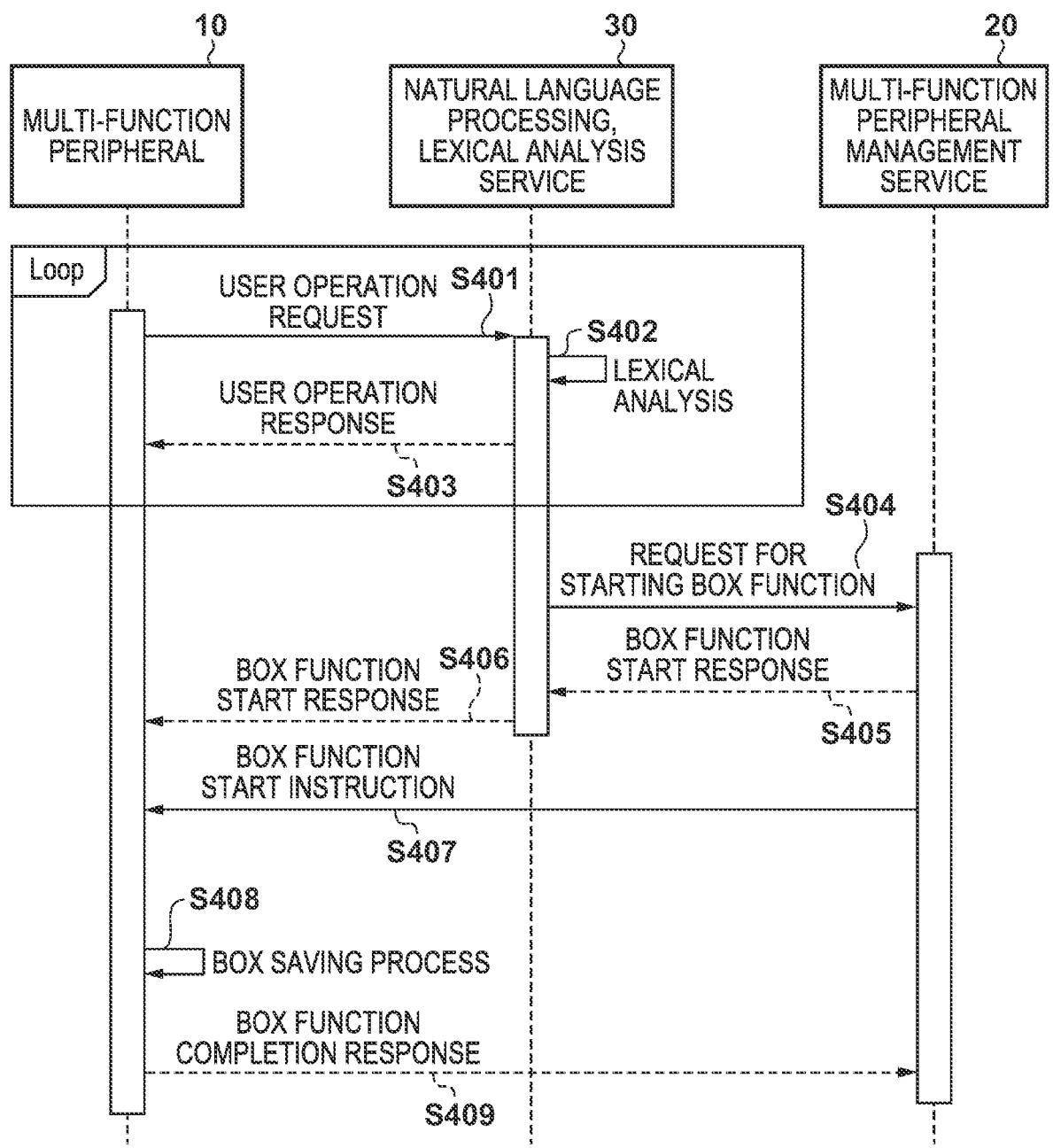
FIG. 4 is a sequence chart illustrating a box saving process according to the first embodiment.

Next, the sequence of a saving process of this embodiment will be described with reference to FIG. 4. Here, the sequence of a process for saving image data in an arbitrary box desired by the user will be described as an example. The process to be described below is implemented, for example, by the CPU of each apparatus reading out a control program stored in the ROM or HDD to the RAM and executing it.

When the interaction agent on the multi-function peripheral 10 receives an operation from the user in the natural language, the multi-function peripheral 10 transmits a user operation request expressed in the natural language to the natural language processing/lexical analysis service 30 in S401. Then, in S402, the natural language processing/lexical analysis service 30 performs natural language processing and lexical analysis on the user operation request. As a result of the analysis, if any piece of pre-registered information is not obtained, the natural language processing/lexical analysis service 30 transmits a user operation response expressed in the natural language to the multi-function peripheral 10 in S403. In the natural language processing/lexical analysis service 30, the pieces of necessary information and a process to be executed when all the pieces of necessary information are obtained are registered in advance, and the multi-function peripheral 10 and the natural language processing/lexical analysis service 30 perform the above-described communication until all the pieces of necessary information are obtained.

Figure 3:
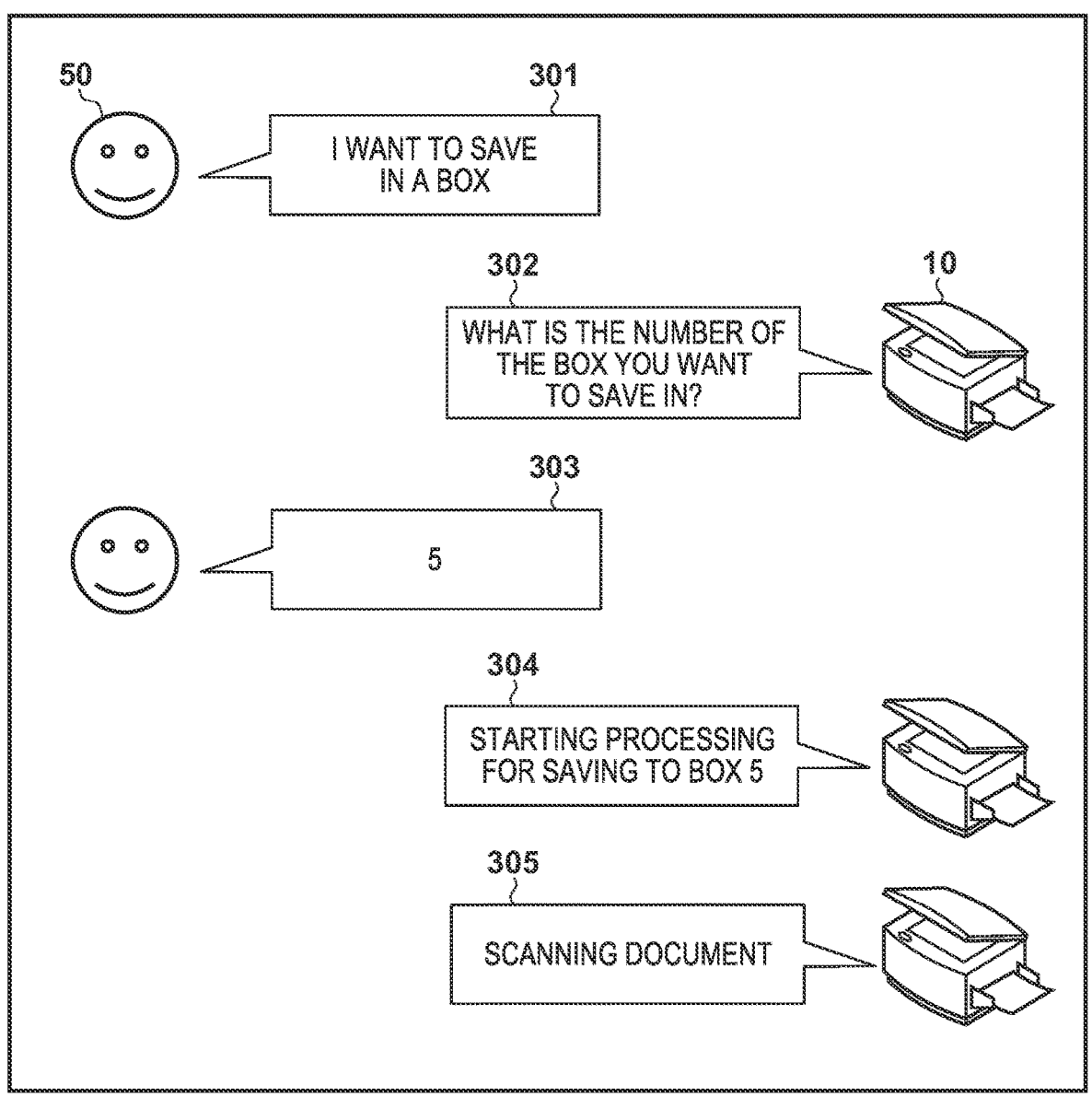
FIG. 3 is a view showing an operation example of an interaction agent according to the first embodiment.

Taking FIGS. 3 and 8 as an example, the necessary information for, for example, the box function indicates the information 800 for executing the action 802 in FIG. 8. In FIG. 3, when the user 50 notifies the multi-function peripheral 10 that "I want to save in a box", information such as "the number of box to save" is not obtained. Therefore, the natural language processing/lexical analysis service 30 inquires of the user 50 the additional information 804 (box number) necessary to execute the action 802 "save".

Then, in S404, if all the pieces of necessary information are obtained as a result of the above-described communication, the natural language processing/lexical analysis service 30 transmits a request for starting the box function of the multi-function peripheral to the multi-function peripheral management service 20. If the request for starting the box function of the multi-function peripheral is received from the natural language processing/lexical analysis service 30, the multi-function peripheral management service 20 transmits a box function start response to the natural language processing/lexical analysis service 30 in S405. If the box function start response is received from the multi-function peripheral management service 20, the natural language processing/lexical analysis service 30 transmits the box function start response to the multi-function peripheral 10 in S406. In addition, the multi-function peripheral management service 20 transmits a box function start instruction to the multi-function peripheral 10 in S407. The notification in each of the above-described box function start response and the box function start instruction includes the box number determined in the interaction with the user (for example, in 303). Therefore, the multi-function peripheral 10 executes the box function process with respect to the designated box number. Note that the multi-function peripheral 10 can also access a box of a box number other than the above-described designated box number in the box function process.

Next, in S408, if the box function start instruction is received, the multi-function peripheral 10 executes a box saving process to be described later with reference to FIG. 12. The saving format may be any format such as PDF, JPEG, or TIFF. Then, after the box saving process is completed, the multi-function peripheral 10 responds to the multi-function peripheral management service 20 with a box function completion response in S409, thereby terminating the process. Here, the multi-function peripheral 10 generates file management information and transmits it to the multi-function peripheral management service 20. The multi-function peripheral management service 20 stores the file management information received from the multi-function peripheral 10 in a storage device such as the HDD provided in the multi-function peripheral management service. The multi-function peripheral management service 20, which stores the file management information as a file information management database so that the history of the file management information received in the past can be searched, executes a database update process.

<File Management Information>

Here, an example of file management information 700 will be described with reference to FIG. 7. Although the file management information 700 to be described below is information managed by the multi-function peripheral management service 20, each multi-function peripheral may also hold the file management information 700 related to an interaction as a record of the interaction with a user. The file management information 700 is generated for each saved data (file), and includes information related to the saved data and information related to a user who saved the data (file). Note that the file management information 700 described with reference to FIG. 7 does not intend to limit the present invention, so all pieces of information may not be managed, or another information may be additionally managed.

The file management information 700 includes information such as a file name 701, a save date and time 702, a paper size 703, a page count 704, a box number 705, a user ID 706, and a voice ID 707. The user ID 706 may be specified by the user 50 performing personal authentication or the like on the multi-function peripheral 10 using an ID input or an ID card. As to the voice ID 707, the natural language processing/lexical analysis service 30 may register the feature information of the voice of the user 50 in advance, identify the user at the time of the request of a user operation, and notify the multi-function peripheral 10 of the identified user at the time of the response to the user operation. Further, the information included in the file management information 700 is not limited to those described above, and other information may be included. In addition, when searching for a corresponding file in accordance with a user instruction, searching only files saved with the pre-identified user ID 706 or voice ID 707 further improves the convenience.

<Process Procedure>

Next, the process procedure of the multi-function peripheral 10 according to this embodiment will be described with reference to FIG. 11. The process to be described below is implemented, for example, by the CPU 101 of the multi-function peripheral 10 reading out a control program stored in advance in the ROM 103 or the HDD 104 to the RAM 102 and executing it. Here, a case in which a user interacts with the interaction agent by the voice will be described.

In step S1101, the CPU 101 receives the voice input of a user via the microphone 17, and recognizes the voice (specifies the speaker). Reception of a voice input from a user is performed at the time of voice input upon activating the interaction agent or the input in 301 described with reference to FIG. 3. In speaker recognition, the features of a received voice signal are extracted, and feature information for each user is generated. The information specified by the speaker recognition is unique biological information, and is used as information for specifying the speaker. A known method is used for the process here, and a detailed description thereof will be omitted. The speaker recognition may be executed by the multi-function peripheral 10 or may be executed by a server on the cloud. When the speaker recognition is executed by a server on the cloud, a received voice signal is transmitted to the server, and the voice ID linked to the unique feature information may be obtained as a response.

When the speaker is specified, in step S1102, the CPU 101 determines whether the specified speaker is already registered. Here, it may determine, with reference to a table of registered speakers, whether the information that matches the specified speaker, for example, the voice ID, is registered. The table may be a table held by the multi-function peripheral 10, or file management information managed by the multi-function peripheral management service 20. When the file management information of the multi-function peripheral management service 20 is used, the CPU 101 may transmit the voice ID (feature information) of the specified speaker to the multi-function peripheral management service 20, and information indicating whether the specified speaker is already registered may be obtained as a response. Alternatively, the CPU 101 may first make determination with reference to the table held by the own apparatus, and if there is no matching person, it may inquire of the multi-function peripheral management service 20. This is effective when each multi-function peripheral registers only the associated users so as to effectively use its memory resource. If the speaker is already registered, the process advances to step S1104; otherwise, the process advances to step S1103.

In step S1103, the CPU 101 registers the voice ID of the specified speaker in the table held by the multi-function peripheral 10 or in the multi-function peripheral management service 20, and advances to step S1104. In step S1104, the CPU 101 determines whether the request by the user operation analyzed in S402 is a box saving process. If it is a box saving process, the process advances to step S1106; otherwise, the process advances to step S1105. In step S1105, the CPU 101 accesses (guides) a box in accordance with the user request, and terminates the process. On the other hand, in step S1106, the CPU 101 executes a saving process to a box that is a predetermined area of the HDD 104, and terminates the process. The details of the box saving process will be described later with reference to FIG. 12.

<Box Saving Process>

Next, the details of the box saving process in step S1106 according to this embodiment will be described with reference to FIG. 12. The process to be described below is implemented, for example, by the CPU 101 of the multi-function peripheral 10 reading out a control program stored in advance in the ROM 103 or the HDD 104 to the RAM 102 and executing it.

In step S1201, the CPU 101 causes the scanner unit 14 to read a document placed in the automatic document feeder or on the document table of the multi-function peripheral 10 and generates the image data thereof. Then, in step S1202, the CPU 101 saves the generated image data in a box of a box number specified in S406 or S407. Further, in step S1203, the CPU 101 generates and saves the file information of the saved image data. Here, file information includes at least a file name, a save date and time, a file size (paper size), a page count, the box number of the box used to save, and a user ID. Note that in addition to or instead of a user ID, the voice ID (feature information) of the specified speaker may be included.

Next, in step S1204, the CPU 101 updates and learns a box use history by the multi-function peripheral 10. Here, the box use history includes the contents and date and time of the operation performed using the box of a predetermined box number. Subsequently, in step S1205, the CPU 101 links the information (user ID or voice ID) of the specified speaker, the generated file information, and the box use history to each other and saves them.

Note that the information saved in steps S1203 to S1205 may be saved in the multi-function peripheral 10, may be transmitted to the multi-function peripheral management service 20 and saved therein, or may be saved in both of them. The saved information is managed by the multi-function peripheral 10 or the multi-function peripheral management service 20 as the file management information described with reference to FIG. 7 and, when the interaction agent is activated, it can be used to estimate a box which the user possibly accesses. That is, in the system according to this embodiment, a speaker is specified from a voice received upon activating the interaction agent or at the user input in 301 described above, and the box used by the specified speaker in the past is presented. This can improve the convenience in the user interface.

Although this embodiment has been described as to the sequence of saving a scanned document in a box, the same may be applied to a case of printing a file saved in a box or a case of transmitting the file to the outside. In these cases, the user only needs to give, to the interaction agent, not a box number used for saving but the file to be printed or the destination (for example, mail address) of the file to be transmitted.

According to the present invention, the management information of the image data (file) saved by the box function is stored, and the next time the box function is used, the management information of the image data is referred to via the interaction agent so that the image data desired by the user can be specified. This makes it possible to improve the user convenience in the operation of the box function using the interaction agent. The method for utilizing the management information will be described below in more detail.

As described above, the user 50 conventionally needs to give the box number used for saving to the interaction agent of the multi-function peripheral 10. However, when the user 50 reuses (prints, transmits to the outside via a network, or the like) a saved file, operation by the voice alone is inconvenient for searching for the file if the user does not remember when and where what file was saved. It is conceivable that the user 50 uses both the operation by the voice and the operation by the operation unit 15, but this results in a complicated operation. Therefore, in this embodiment, an example of an operation for further improving the convenience for a user operating the box function by the voice will be described.

<Box Print Process>

Figure 5:
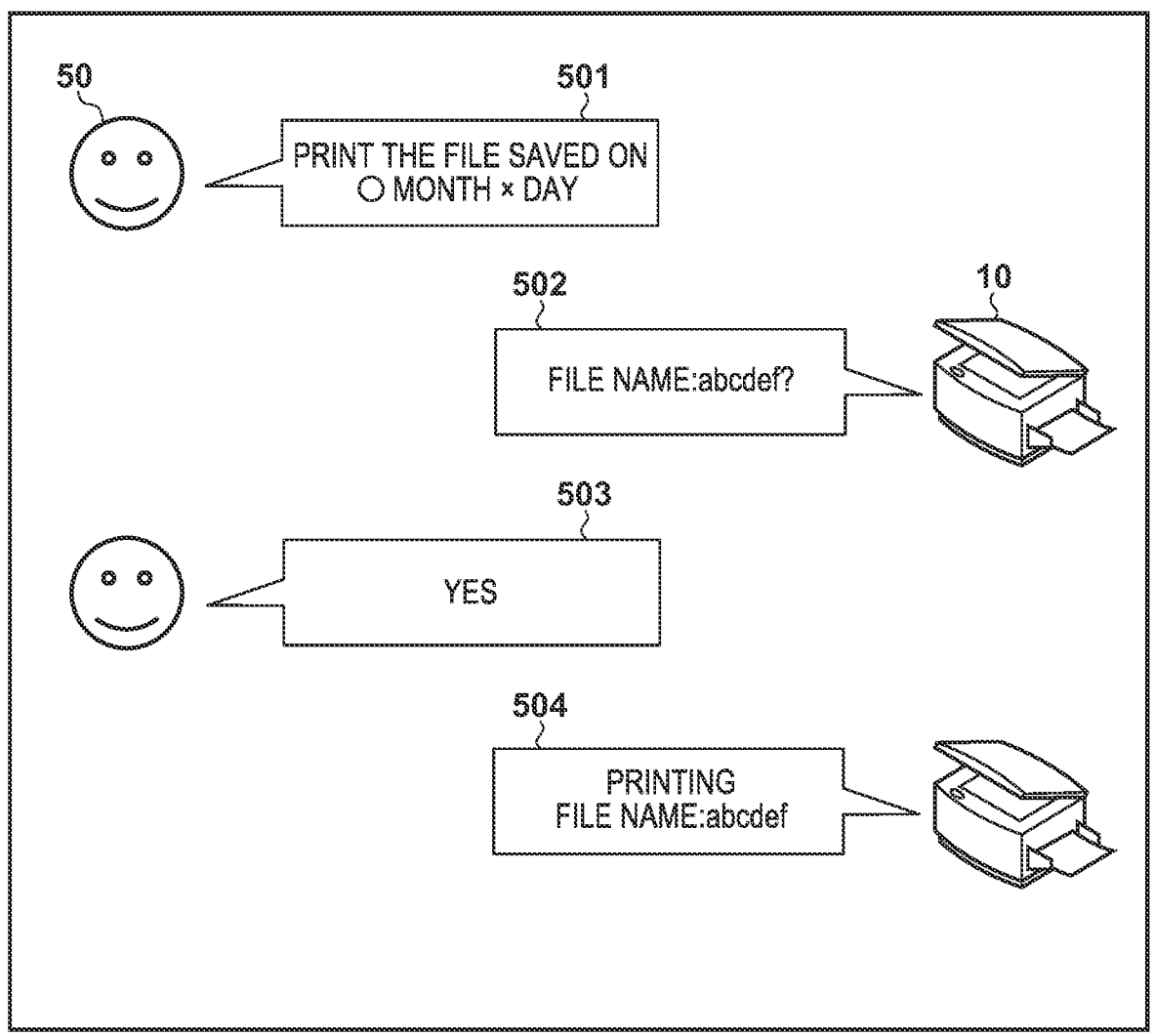
FIG. 5 is a view showing an operation example of the interaction agent according to the first embodiment.

Next, an operation example of the interaction agent in a box print process according to this embodiment will be described with reference to FIG. 5. First, the interaction agent is activated on the multi-function peripheral 10 by the user 50 operating the operation unit 15 of the multi-function peripheral 10 or the user 50 uttering a predetermined word to the multi-function peripheral 10, and the multi-function peripheral 10 transitions to an interaction mode. Then, in a state in which the interaction agent on the multi-function peripheral 10 is activated, the user 50 instructs to activate the box function by the voice in the natural language in 501. Reference numerals 501 and 503 denote pieces of information input by the voices of the user 50. Reference numerals 502 and 504 denote natural language data played by voices via the speaker 16 or displayed on the operation unit 15 in accordance with transmission from the natural language processing/lexical analysis service 30.

In 501, the user utters "print the file saved on ○ month× day". In response to this, as described above with reference to FIG. 11, the multi-function peripheral 10 specifies the speaker from the voice of the user input based on the registration information (in particular, the voice ID) of the speaker at the time of saving the data (file) by the user and the file information linked to the registration information. Further, the multi-function peripheral 10 specifies the saved file linked to the specified speaker. Note that these specification processes may be performed in the multi-function peripheral management service 20 or the natural language processing/lexical analysis service 30.

After that, the multi-function peripheral 10 responds to the user with "file name: abcdef?" in accordance with the instruction from the natural language processing/lexical analysis service 30. If it is the desired file, the user 50 responds "Yes" in 503. The multi-function peripheral 10 responds "print the file name: abcdef" in 504 and executes printing.

<Sequence of Box Print Process>

Figure 6:
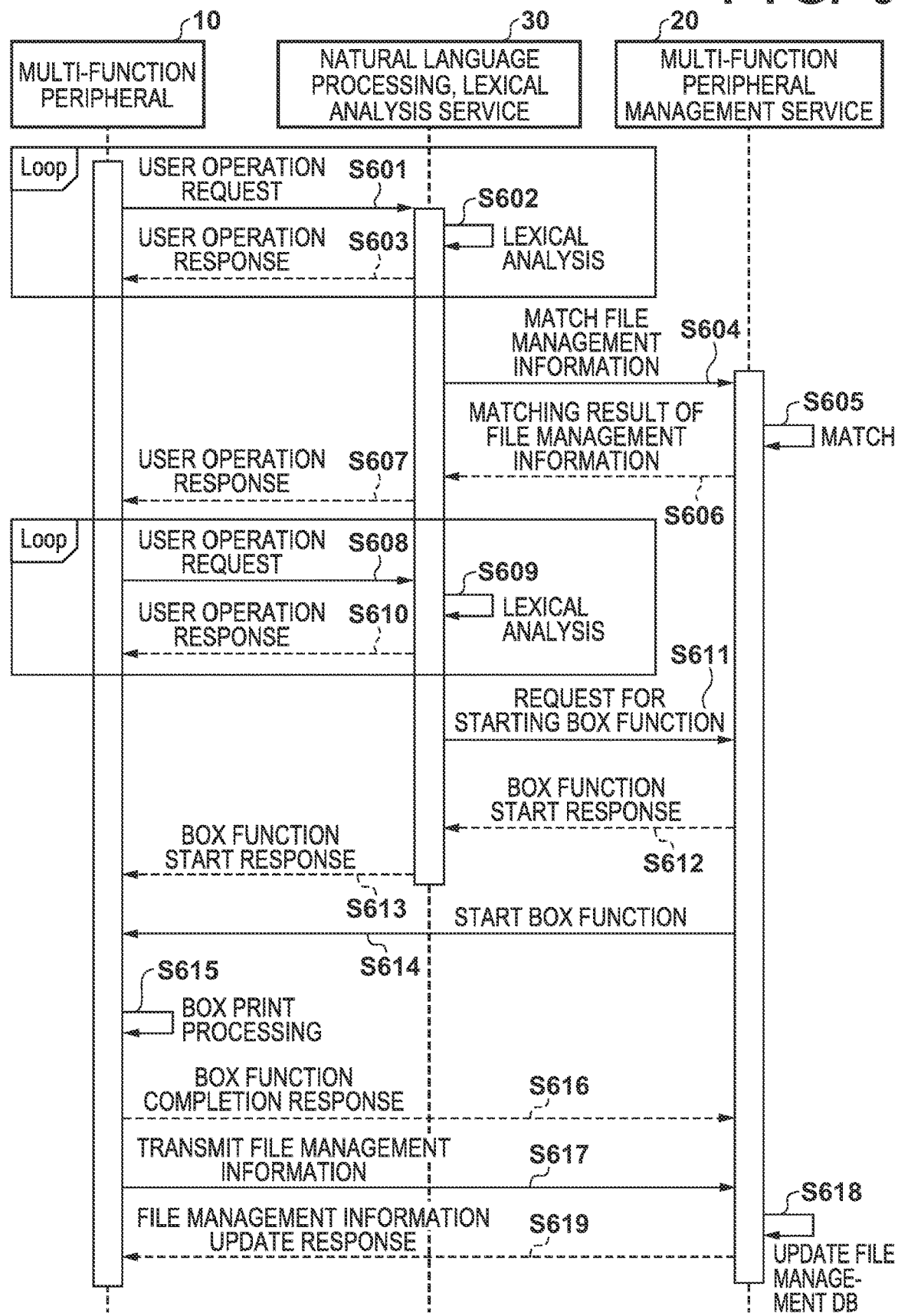
FIG. 6 is a sequence chart illustrating a box print process according to the first embodiment.

Next, the sequence of a box print process according to this embodiment will be described with reference to FIG. 6. The process to be described below is implemented, for example, by the CPU of each apparatus reading out a control program stored in the ROM or HDD to the RAM and executing it.

In S601, the multi-function peripheral 10 transmits the input natural language data (501) to the natural language processing/lexical analysis service 30. Here, as described above with reference to FIG. 11, the multi-function peripheral 10 specifies the speaker from the voice of the user input. In S602, the natural language processing/lexical analysis service 30 analyzes the input natural language data, divides it into clauses and words, takes out nouns from the respective words, and classifies those nouns into proper nouns and other nouns. Based on the result, the natural language processing/lexical analysis service 30 determines whether all the pieces of pre-registered "information for executing an action" are obtained from the classified nouns. As a result of the analysis, if any piece of pre-registered information is not obtained, the natural language processing/lexical analysis service 30 transmits a user operation response expressed in the natural language to the multi-function peripheral 10 in S603. In the natural language processing/lexical analysis service 30, the pieces of necessary information and a process to be executed when all the pieces of necessary information are obtained are registered in advance, and the multi-function peripheral 10 and the natural language processing/lexical analysis service 30 perform the above-described communication until all the pieces of necessary information are obtained.

Here, if the speaker can be specified, the natural language processing/lexical analysis service 30 cooperates with the multi-function peripheral management service 20 and the multi-function peripheral 10 to estimate the box number or file that the user is trying to access. The estimated information is inquired of the user in the user operation response (502). In this manner, by specifying the information (box or file) or the like under management from the voice ID of the user and presenting it to the user, the convenience in the user interface can be improved. For example, when "○ month× day" representing the save date and time is included as a noun in the file management information, the natural language processing/lexical analysis service 30 inquires of the multi-function peripheral management service 20 whether there is a file saved on "○ month×day" by the specified speaker in S604. Then, in S605, the multi-function peripheral management service 20 searches the file management information to be described later for a file matching with the save date and time "○ month×day". If there is a matching file, the multi-function peripheral management service 20 transmits the matching result of the file management information to the natural language processing/lexical analysis service 30 in S606. After that, in S607, the natural language processing/lexical analysis service 30 converts the matching result into the voice in the natural language and transmits it to the multi-function peripheral 10 (502).

Thereafter, in S608 to S610, similarly to S601 to S603, determination processing is repeated until all the pieces of pre-registered "information for executing an action" are obtained from the voice of the user 50 (503). Then, if all the pieces of necessary information are obtained as a result of the above-described communication, the natural language processing/lexical analysis service 30 transmits a request for starting the box function of the multi-function peripheral to the multi-function peripheral management service 20 in S611. If the request for starting the box function of the multi-function peripheral is received from the natural language processing/lexical analysis service 30, the multi-function peripheral management service 20 transmits a box function start response to the natural language processing/lexical analysis service 30 in S612. If the box function start response is received from the multi-function peripheral management service 20, the natural language processing/lexical analysis service 30 transmits the box function start response to the multi-function peripheral 10 in S613 (504). In addition, the multi-function peripheral management service 20 transmits a box function start instruction to the multi-function peripheral 10 in S614. The start instruction includes at least the box number to be accessed, information indicating a predetermined file, and a box print instruction (print instruction).

If the box function start instruction is received, the multi-function peripheral 10 executes the box print process of a predetermined file saved in the box area of the designated box number in S615. After the box print process is completed, the multi-function peripheral 10 transmits a response to the multi-function peripheral management service 20 as a box function completion response in S616. Then in S617, the multi-function peripheral 10 generates file management information and transmits it to the multi-function peripheral management service 20. The multi-function peripheral management service 20 stores the file management information received from the multi-function peripheral 10 in the storage device such as the HDD provided in the multi-function peripheral management service.

Assuming that the multi-function peripheral management service 20 stores the history of the file management information as a file information management database such that the history of the file management information received in the past can be searched, a database update process is performed in S618. In S619, the multi-function peripheral management service 20 transmits, to the multi-function peripheral 10, a file management information update response indicating that the file management information has been successfully updated, thereby terminating the process.

As described above, the image processing apparatus according to this embodiment includes the interaction agent that can interact with a user using a natural language. The interaction agent can be realized in cooperation with the natural language processing/lexical analysis service and multi-function peripheral management service of various servers on the cloud. The image processing apparatus receives the voice of a user who interacts with the interaction agent, specifies the user from the features of the received voice (obtains the user identifier), estimates the saving area or saved data linked to the specified user, and presents the estimated saving area or saved data (box) via the interaction agent. In this manner, according to this embodiment, when accessing information saved in the apparatus by an operation via the interaction agent, it is possible to appropriately specify the information which the user desires to access, so that the user convenience can be improved.

In addition, if the user cannot be specified, the image processing apparatus according to this embodiment newly registers the user based on the feature of the voice. At this time, identification information for specifying the user from the voice and the history information of the used file and saving area are linked to each other and registered. Further, when a file is saved in a box area, the file management information is stored in the database and managed. The file management information includes at least one of a file name, a save date and time, the paper size of a document, the page count of a document, a box number indicating a box area used to save, a user ID, and a voice ID. In this manner, according to this embodiment, by storing the file management information in a database, the convenience in reusing a file in a box can improve.

Second Embodiment

The second embodiment of the present invention will be described below. In the first embodiment described above, an operation in which file management information is stored in a database and a file in a box is printed has been described. In the second embodiment, an operation of transmitting a file in a box to the outside of a multi-function peripheral 10, for example to the mail address of a destination, via a network such as a LAN 12 will be described.

<Box Transmission Process>

Figure 9:
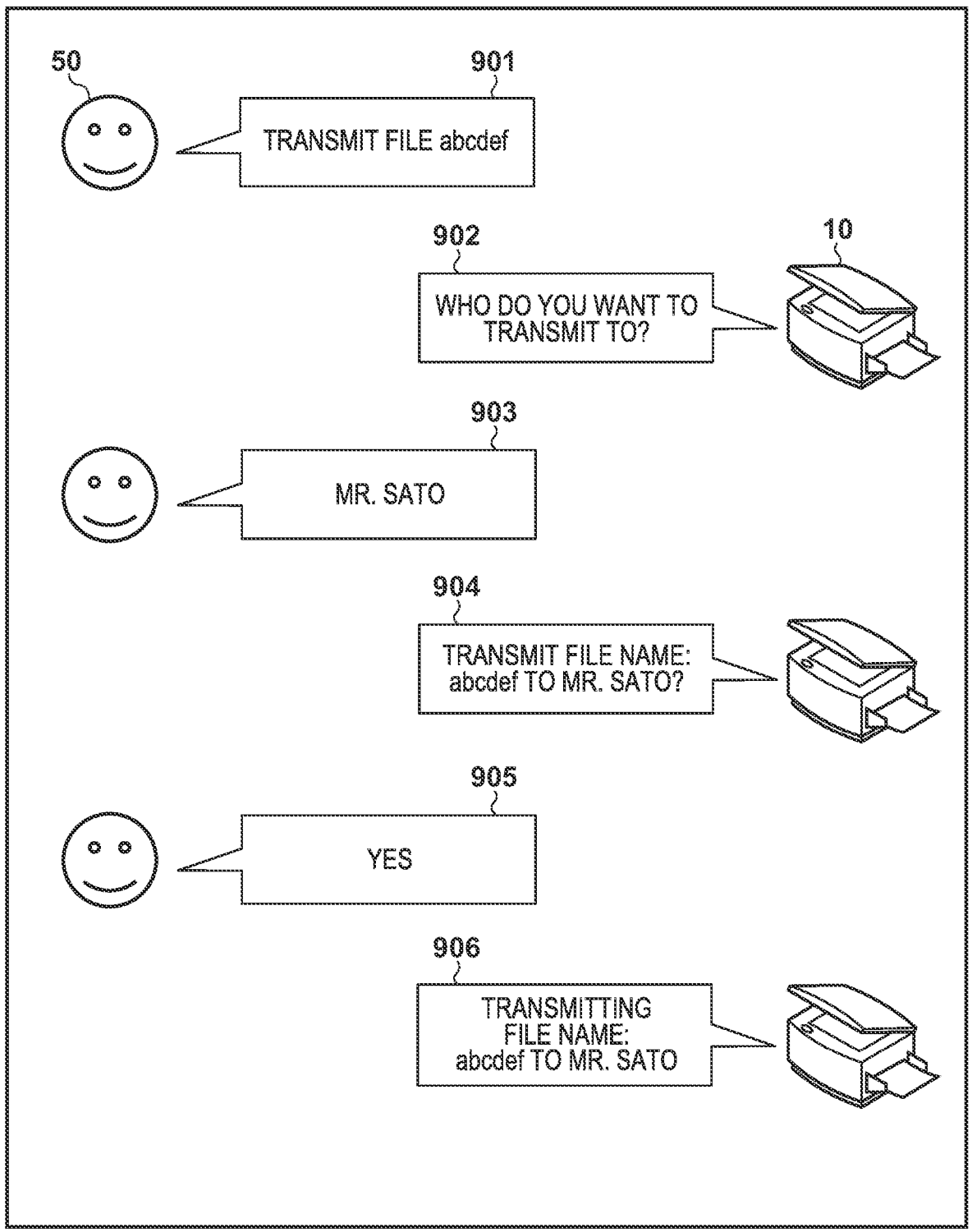
FIG. 9 is a view showing an operation example of the interaction agent according to the second embodiment.

With reference to FIG. 9, an operation example of an interaction agent according to this embodiment will be described. First, the interaction agent is activated by a user 50 operating an operation unit 15 of the multi-function peripheral 10 or the user 50 uttering a predetermined word to the multi-function peripheral 10. The multi-function peripheral 10 transitions to an interaction mode.

Then, in a state in which the interaction agent on the multi-function peripheral 10 is activated, the user 50 instructs to activate a box function by the voice in a natural language in 901. Here, the multi-function peripheral 10 specifies the speaker in the manner similar to that described with reference to FIG. 5. Reference numerals 901, 903, and 905 denote pieces of information input by the voices of the user 50. Reference numerals 902, 904, 906 denote natural language data played by voices via a speaker 16 or displayed on the operation unit 15 in accordance with transmission from the natural language processing/lexical analysis service 30.

More specifically, the user utters "transmit a file abcdef" in 901. The natural language processing/lexical analysis service 30 analyzes it as an instruction to execute a box transmission process, and interactively obtains information necessary for that, for example, information of the transmission destination (902, 903). After that, if all the pieces of necessary information are obtained, the natural language processing/lexical analysis service 30 confirms the final instruction (904, 905), and requests the multi-function peripheral 10 to execute the process (906).

<Sequence of Box Transmission Process>

Figure 10:
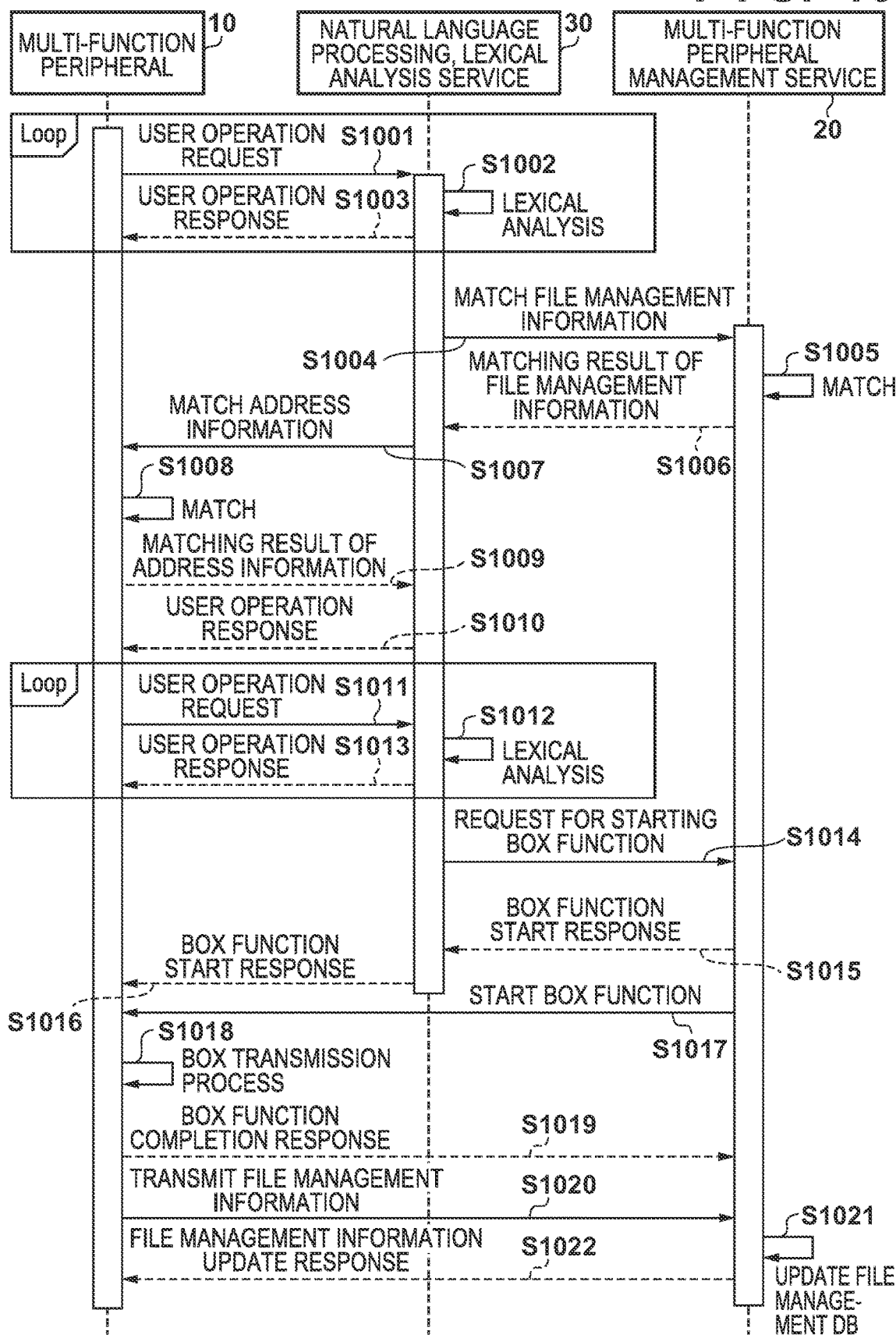
FIG. 10 is a sequence chart illustrating a box transmission process according to the second embodiment.

Next, the sequence of a box transmission process according to this embodiment will be described with reference to FIG. 10. Here, parts different from those illustrated in FIG. 6 described in the above first embodiment will be mainly described. That is, only the point that the natural language processing/lexical analysis service 30 inquires of the multi-function peripheral 10 about the address of a transmission destination in S1007 to S1009 will be described. The other processing performed in S1001 to S1006 and S1014 to S1022 are similar to those performed in S601 to S607 and S608 to S619 in FIG. 6, respectively, and the description thereof will be omitted.

The box of the multi-function peripheral 10 in this embodiment has an address book function, so that if "name" and "email address" are registered in advance, a file can be transmitted using the address book in box transmission. In S1007, based on the analysis result of the voice input in 903, the natural language processing/lexical analysis service 30 inquires of the multi-function peripheral 10 whether the matching name (here, "Sato") exists in the address book of the multi-function peripheral 10.

In S1008, the multi-function peripheral 10 searches the address book for the name included in the address information input from the natural language processing/lexical analysis service 30, and transmits the search result to the natural language processing/lexical analysis service 30. If the name exists in the address book, the natural language processing/lexical analysis service 30 confirms the final instruction in S1010 (904).

Thereafter, in S1017, the multi-function peripheral management service 20 adds to a box function start instruction at least the destination information (the name registered in the address book), the box number, the file, a box transmission process instruction (transmission instruction) and transmits it to the multi-function peripheral 10. In S1018, when executing the box transmission process, the multi-function peripheral 10 refers to the mail address based on the destination information, determines the transmission destination of the file, and executes the process.

As described above, the image processing apparatus according to this embodiment can acquire an effect similar to that of the above first embodiment even when executing box transmission for transmitting a file saved in a box to an external apparatus. More specifically, by specifying the user (speaker) who performs an operation via the interaction agent and presenting the box or saved file associated with the specified speaker, it is possible to improve the convenience of the user instructing to perform box transmission.

<Modifications>

Note that the present invention is not limited to the first and second embodiments described above, and various modifications can be made. For example, in the embodiments described above, there has been described control for specifying the voice ID of a user, thereby specifying the box number and the file saved therein linked to the voice ID. However, a user does not always use only one box, and it is naturally expected that a user uses a plurality of boxes, files and the like. In such a case, it is cumbersome for the user to check the boxes one by one to find the desired saved file. Therefore, in such a case, it may be controlled such that each of boxes and files is linked to the voice ID as the file management information and a predetermined box or file is preferentially presented based on the usage frequency or latest usage of the box and file with reference to the usage history. This can improve the convenience of the user interface even in the case as described above.

Further, in the embodiments described above, an operation for printing the file in the presented box and an operation for transmitting it to a predetermined email address have been described, but the present invention is not limited to those and may be applied to various outputs. For example, the present invention may be applied to the output such as FAX transmission, saving in a network storage such as a shared folder or cloud storage, or preview display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-184982 filed on Sep. 28, 2018, which is hereby incorporated by reference herein in its entirety.

What is claimed is:

1. An image processing system capable of managing image data using a plurality of boxes for a box function, comprising:
    a microphone that obtains a sound;
    a speaker that outputs a sound;
    a server configured to function as:
        a unit that obtains first natural language voice information of a user inputted via the microphone, and registers a voice ID for identifying the user based on biological information obtained from the first natural language voice information;
        a unit that obtains second natural language voice information of a user inputted via the microphone, obtains the voice ID based on biological information obtained from the second natural language voice information, and lexical information generated based on the second natural language voice information; and
        a unit that specifies, according to obtaining one or more words corresponding to an intention to use the box function from the obtained lexical information, at least one box associated with the user identified by the voice ID among the plurality of boxes as information available for performing the box function,
    wherein the speaker outputs a message at least including identification information of the specified at least one box as a response to the second natural language voice information.

2. The system according to claim 1, wherein the identification information of the specified at least one box information includes at least one of a box number of the specified at least one box, a name of the specified at least one box, a name of a file stored in the specified at least one box, information indicating presence/absence of a file stored in the specified at least one box, and the number of files stored in the specified at least one box.

3. The system according to claim 1, wherein the server is further configured to function as:
    a unit that displays the identification information of the specified at least one box via a display.

4. The system according to claim 1, wherein the server is further configured to function as the unit that obtains the voice ID based on information that includes a word for starting a voice operation.

5. The system according to claim 1, wherein the server is further configured to function as the unit that obtains the voice ID based on a feature of the biological information.

6. The system according to claim 1, where the server is further configured to function as a unit that registers another voice ID based on natural language voice information of another user obtained via the microphone in a case where there is no registered voice ID corresponding to the another voice ID.

7. The system according to claim 6, wherein the other voice ID is registered to the image data.

8. The system according to claim 1, wherein the server is further configured to function as
    a unit that saves an image in one of the plurality of boxes based on natural language voice information instructing to save image data; and
    a unit that generates management information indicating information about the image data.

9. The system according to claim 8, wherein the management information includes at least one of a file name, a saving date and time, a paper size of a document, a page count of a document, a box number indicating a box area used to save, a user ID, and a voice ID.

10. The system according to claim 1, wherein the identification information includes box operation history linked to the identified user.

11. The system according to claim 1, wherein the server is further configured to function as a unit that accepts an output instruction of image data.

12. The system according to claim 1, wherein the server is further configured to function as: the unit that specifies, in a case where the instruction information corresponding to execution of the box function is obtained, the at least one box associated with the obtained voice ID among the plurality of boxes based on a usage history of the obtained voice ID.

13. The system according to claim 1, wherein the lexical information based on the second natural language voice information does not include a word or words corresponding to identification information of one of the plurality of boxes.

14. An image processing apparatus capable of managing image data using a plurality of boxes for a box function, comprising:
    a speaker that outputs a sound;
    one or more controllers configured to function as:
        a unit that obtains first natural language voice information of a user inputted via the microphone, and registers a voice ID for identifying the user based on biological information obtained from the first natural language voice information;
        a unit that obtains second natural language voice information of a user inputted via a microphone, obtains the voice ID based on biological information obtained from the second natural language voice information, and lexical information generated based on the second natural language voice information;
        a unit that specifies, according to obtaining one or more words corresponding to an intention to use the box function from the obtained lexical information, at least one box associated with the user identified by the voice ID among the plurality of boxes as information available for performing the box function; and
        a unit that cause the speaker to output a message at least including a name of the specified at least one box as a response to the second natural language voice information.

15. An image processing method, of an image processing apparatus comprising a speaker that outputs a sound, capable of managing image data using a plurality of boxes for a box function, the method comprising:
    obtaining first natural language voice information of a user inputted via the microphone, and registering a voice ID for identifying the user based on biological information obtained from the first natural language voice information;

obtaining second natural language voice information of a user inputted via a microphone, obtaining the voice ID based on biological information obtained from the second natural language voice information, and lexical information generated based on the second natural language voice information;

specifying, according to obtaining one or more words corresponding to an intention to use the box function from the obtained lexical information, at least one box associated with the user identified by the voice ID among the plurality of boxes as information available for performing the box function; and causing the speaker to output a message at least including a name of the specified at least one box as a response to the second natural language voice information.

\* \* \* \* \*